United States Patent [19]

Pereman et al.

[11] Patent Number: 5,049,178
[45] Date of Patent: Sep. 17, 1991

[54] PARTIAL PRESS APPARATUS AND METHOD FOR GLASS SHEET BENDING

[75] Inventors: Gordon F. Pereman, Columbus; John D. Kellar, Pontypool, both of Canada

[73] Assignee: PPG Industries, Inc., Pittsburgh, Pa.

[21] Appl. No.: 405,814

[22] Filed: Sep. 11, 1989

[51] Int. Cl.$^5$ .......................................... C03B 23/023
[52] U.S. Cl. ..................................... 65/106; 65/107; 65/273; 65/291
[58] Field of Search ................. 65/106, 107, 273, 287, 65/290, 291

[56] References Cited

U.S. PATENT DOCUMENTS

| | | | |
|---|---|---|---|
| 3,116,993 | 2/1959 | Richardson | 65/107 |
| 3,220,819 | 3/1960 | Jendrisak | 65/290 |
| 3,364,005 | 1/1968 | Leflet et al. | 65/107 |
| 3,511,628 | 5/1970 | Adamson | 65/107 |
| 4,074,996 | 2/1978 | Hagedorn et al. | 65/106 |
| 4,265,650 | 5/1981 | Reese et al. | 65/104 |
| 4,290,796 | 9/1981 | Reese et al. | 65/287 |
| 4,496,386 | 1/1985 | Hymore et al. | 65/106 |
| 4,501,603 | 2/1985 | Frank et al. | 65/106 |
| 4,626,267 | 12/1986 | Reese et al. | 65/106 |
| 4,804,397 | 2/1989 | Stas et al. | 65/107 |
| 4,909,820 | 3/1990 | Hirotsu et al. | 65/106 |

FOREIGN PATENT DOCUMENTS 1100238 11/1958 Fed. Rep. of Germany .
0250311A1 6/1987 France .

Primary Examiner—Joye L. Woodard
Attorney, Agent, or Firm—Andrew C. Siminerio; Donald C. Lepiane

[57] ABSTRACT

A glass sheet is supported on a shaping rail and conveyed through a heating lehr. A press assembly moves along with the glass such that there is no relative horizontal movement between the glass sheet and press assembly and shapes a selected portion of the sheet. A rail support membe moves along with the press assembly to maintain the shaping rail configuration during the shaping operation.

17 Claims, 6 Drawing Sheets

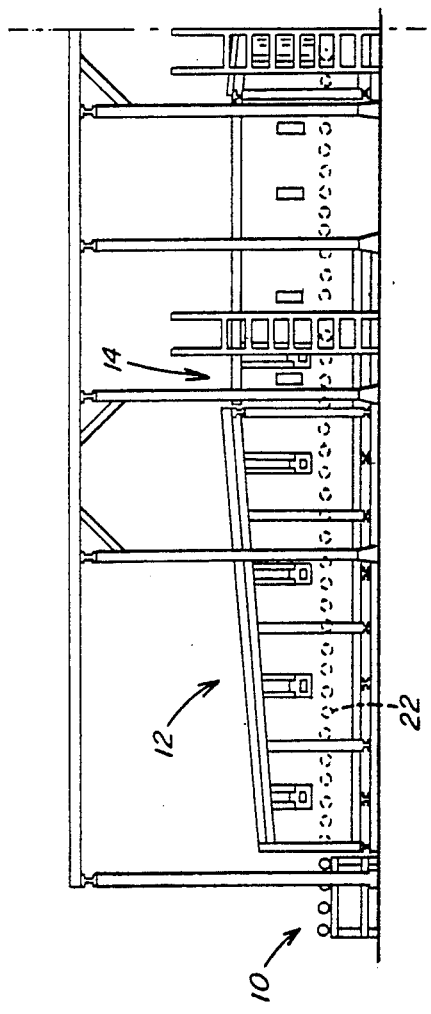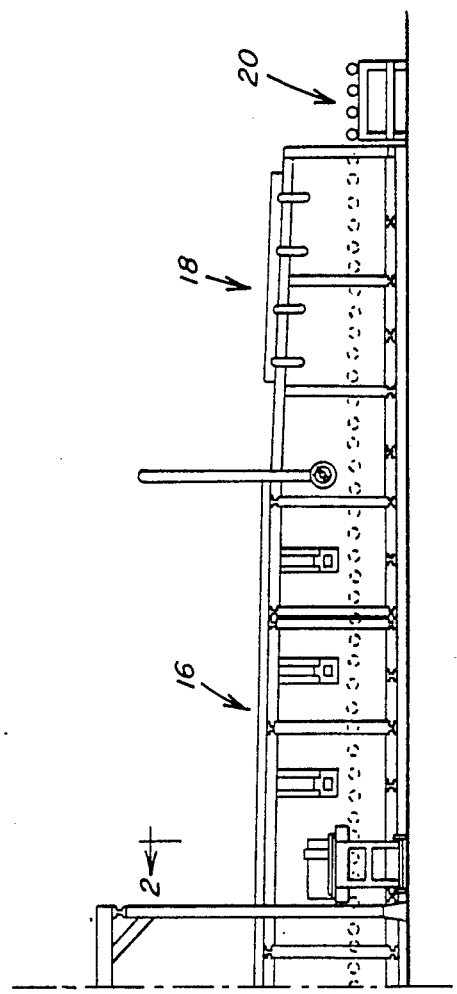

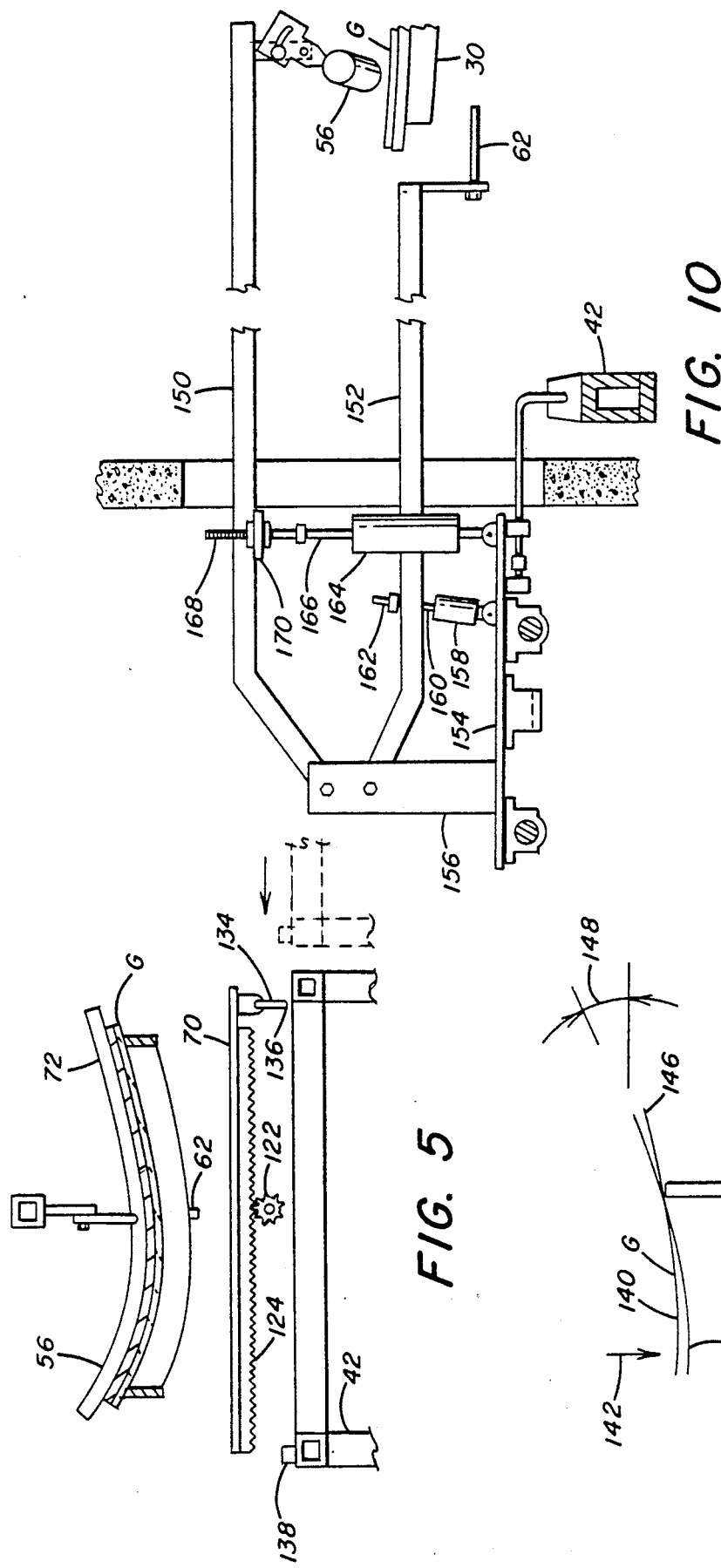

PARTIAL PRESS APPARATUS AND METHOD FOR GLASS SHEET BENDING

BACKGROUND OF THE INVENTION

1. Field of the Invention

This invention relates to sag bending of glass sheets on bending molds and in particular to a method and apparatus for press bending selected portions of the glass sheets on bending molds while moving through a heating lehr.

2. Technical Considerations

In the practice of sag bending to form shaped glass windows for automobiles and the like as disclosed in U.S. Pat. No. 4,375,978 to Reese, glass sheets are positioned on and supported by a skeletal bending mold. The shaping rail of the mold has a shape and configuration similar to that of the shaped glass sheet at a location slightly inboard of its peripheral edge. The bending molds are then conveyed in succession through a heating lehr where the glass sheet is heated to its deformation temperature such that it begins to sag by gravity until the glass sheet conforms to the configuration of the shaping rail. After the glass sheet is shaped, the mold is conveyed through an annealing zone where the glass sheet is cooled in a controlled manner from its deformation temperature through its annealing range to anneal the glass sheet. The glass sagging technique has been the method used to bend two glass sheets, or doublets, simultaneously which sheets are subsequently laminated together to form a laminated automobile windshield. The windshield is curved to conform and blend into the shape of an automobile vehicle in which it is installed.

A critical shape parameter of curved glass sheets used for windshields is the approach angle of the glass sheets along the A post of the vehicle body. The approach angle is the angle at which the windshield meets the vehicle body at the generally vertically extending A-posts of the window frame. It has been found that in sag bending glass sheets with deep sag or reverse curvatures, there is a tendency for the sheets to draw glass from their longitudinal end sections. As a result, the glass sheets may tend to lift off the shaping rail of the outline bending mold and have reduced curvature causing the sheets to deviate from the desired shape and tolerances. This deviation may be caused by overheating the glass sheet along the outer edge of its longitudinal sections to achieve the desired curved configuration.

As automotive stylists strive for more aerodynamic designs, the windshields are assuming more complex and deeper bend configurations. In addition, the windshield edges are approaching the A-post of the vehicle at a more flush fashion to provide a smoother transition between the windshield surface and the vehicle body surface. As the windshield designs become more complicated with compound and complex curvatures, these shapes are becoming increasingly more difficult to control during conventional sag bending operations.

It would be advantageous to develop a method of forming glass sheets and incorporating conventional sag bending techniques with other shaping techniques so as to form and maintain the desired curvatures required for proper vehicle assembly.

PATENTS OF INTEREST

U.S. Pat. No. 3,220,819 to Jenderisak teaches a hold down device for a glass bending mold. Glass doublets are positioned on an outline mold and hold down devices mounted along a selected edge of the bending mold extend over the glass doublet edge and hold the peripheral portion of the glass doublet against the underlying shaping rail. As the glass sheet is heated, the end section of the mold pivots relative to the main portion to shape the heat softened glass sheets while the hold down device maintains the glass doublet edge against the shaping rail.

U.S. Pat. No. 4,265,650 to Reese et al. teaches the press bending of windshield doublets using a pair of vertically aligned upper and lower full surface press faces. Glass sheets are positioned on an outline shaping mold and conveyed through the heating lehr wherein the glass sags by gravity to conform with the mold outline. The mold is then stopped and positioned between the press faces. The lower press face lifts the glass sheets off the outline mold and sandwiches the sheets against the upper press face. After shaping, the lower press redeposits the glass sheets on the outline mold for continued downstream movement.

U.S. Pat. No. 4,496,386 to Hymore et al. teaches a method and apparatus for bending glass sheets. The apparatus includes a lower outline press member having an array of spaced apart shaping rail elements mounted to pass upwardly between adjacent conveyor rolls to contact and support the lower surface of a heat softened glass sheet. A second array of shaping rails is disposed above the conveyor rolls and mounted for movement into and out of association with the spaces between the spaced apart lower shaping rail elements. As the glass sheet is raised by the lower shaping rail and pressed against an upper shaping mold, the second array of shaping rails contacts the lower surface of the glass sheet between the first shaping rails to press the peripheral edge of the glass sheet against the upper shaping mold.

U.S. Pat. No. 4,501,603 to Frank et al. teaches a method and apparatus for shaping glass sheets to complicated shapes. Heat softened glass sheets are lifted off conveying rolls by a lower, slotted lifting mold and pressed against a full surface upper vacuum mold. A movable shaping rail mounted on the upper vacuum mold engages the lower surface of the end portion of the hot glass sheet to sandwich the latter against a corresponding end portion of the upper vacuum mold to shape the glass sheet in the desired complicated configuration.

U.S. Pat. No. 4,804,397 to Stas et al. teaches a partial press for shaping heat softened glass sheets. The glass sheets are supported on a bending mold and conveyed through a heating lehr while a press member contacts selected portions of the glass sheet. The press member moves with the glass sheet so that there is no relative horizontal movement between the press member and the glass as the glass sheet is conveyed through the lehr.

SUMMARY OF THE INVENTION

This invention provides an apparatus for shaping heat softened glass sheets supported on a shaping rail of a bending mold with a pivoting end section. The apparatus includes a biasing arrangement acting on a pressing member and a rail engaging member positioned on a frame. The biasing arrangement moves the pressing member and rail engaging member from first positions wherein the pressing member is spaced from selected portions of the glass sheet surface supported by the mold end section and the rail engaging member is spaced from selected portions of the shaping rail of the mold end section, to second positions wherein the pressing member is biased against the selected portions of the glass sheet surface and the rail engaging member is biased against the selected portions of the shaping rail. In the preferred embodiment of the invention, an outline bending mold with the glass sheet supported thereon is conveyed downstream through a heating lehr. The frame supporting the pressing and rail engaging members is provided with a sliding arrangement that moves downstream with the bending mold supported glass sheet. The movement of the pressing and rail engaging members on the frame is synchronized with the movement of the glass sheet such that there is no relative horizontal movement between the glass sheet and the members in the direction in which the bending mold is moved through the lehr when the members are in contact with the selected portions of the glass and rail.

In one particular embodiment of the invention, a first cylinder pivots a rail support arm to move the rail engaging member into contact with a selected portion of the rail of the mold end section. A second cylinder then rotates a press member support arm such that the press member contacts the selected surface portions of the heated softened glass sheet. The upward pressure provided by the first cylinder prevents the mold end section of the bending mold from pivoting downward when contacted by the press member. A controller controls the downstream movement of the assembly and the pivoting action of the press member and rail support arms, so as to insure that there is no relative horizontal movement between the members and the glass sheet.

This invention also provides a method of shaping selected portions of a glass sheet supported on a shaping rail of a segmented pivoting bending mold. The mold is conveyed through a heating lehr to heat the sheet to its deformation temperature, wherein the glass sheet sags by gravity and the perimeter of the glass sheet substantially conforms to the shape of the shaping rails positioned slightly inboard of the glass sheet perimeter. During heating, the pivoting end section of the mold rotates from an opened to closed position to provide a generally continuous shaping rail that supports the heat softened glass sheet. An additional shaping member having a sheet engaging surface corresponding to the desired shape of a selected portion of the glass supported by the mold end section is biased against the selected portion to conform the glass sheet surface to the sheet engaging surface of the shaping member while a rail support member engages the shaping rail of the mold end section to maintain the position of the rail. The members are conveyed along the lehr such that there is no relative horizontal movement between the shaping and rails support members and the mold supported glass sheet in the direction in which the glass sheet is conveyed through the lehr as a shaping member contacts the glass sheet.

BRIEF DESCRIPTION OF THE DRAWINGS

FIGS. 1a and 1b are longitudinal side views of a typical bending lehr showing the loading, heating, shaping, annealing and unloading sections.

FIG. 5 is a view through line 5—5 of FIG. 3.

FIG. 6 is a schematic illustrating the approach angle of the glass sheet at the shaping rail of the outline mold, with and without the shaping arrangement of the present invention.

FIG. 10 is a side elevation view similar to FIG. 3 of an alternate embodiment of the invention, with portions removed for clarity.

DETAILED DESCRIPTION OF THE INVENTION

Figure 2:
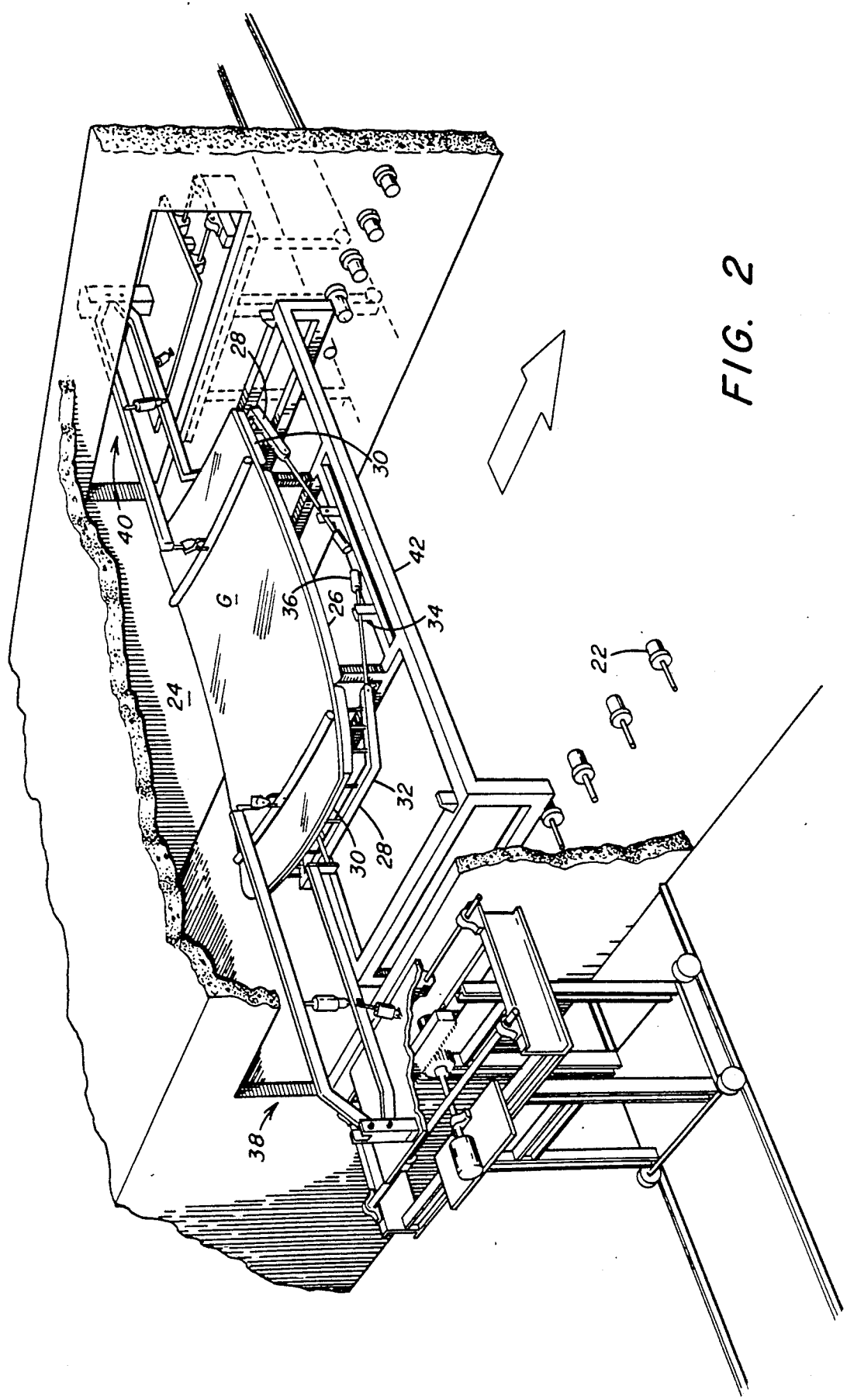
FIGS. 2 is a prospective cross-sectional view taken through the shaping station of the lehr along line 2—2, with portions removed for clarity, showing hot glass sheets supported on an outline ring mold and the preferred shaping assembly of the present invention.

Referring to FIGS. 1a and 1b, there is shown a heating, shaping, and annealing lehr for shaping glass sheets. The lehr begins downstream with a loading zone 10 and includes an initial heating zone 12 of tunnel type configuration, a gravity bending zone 14 downstream of the initial zone 12, an annealing zone 16, and a cooling zone 18 in end to end relation in the downstream portion of the lehr. An unloading zone 20 is positioned beyond the lehr.

A conveyor, comprised of a plurality of stub rolls 22 disposed in transversely opposing, longitudinally spaced relation, extends the entire length of lehr and defines a path of movement along a longitudinal reference line. As illustrated in FIG. 2, each stub roll 22 is mounted on a shaft that extends through a side wall of the lehr and is connected to a conveyor drive means (not shown). The conveyor may be divided into a number of sections, each driven from its own drive means or the conveyor sections may be driven from a common drive through clutches in any manner well known in the art.

A plurality of glass support molds 24, one of which is shown in FIG. 2, which supports one or more glass sheets G as the glass moves through the lehr. Although not limited in the present invention, the mold 24 illustrated in FIG. 2 is similar to the mold disclosed in U.S. Pat. Nos. 4,626,267 to Reese and 4,804,397 to Stas et al., which teachings are herein incorporated by reference, and in particular is an articulating mold with pivoting end sections. The mold 24 is provided with opposed, spaced apart central shaping rails 26 (only one shown in FIG. 2) and two pivoting end sections 28, each of which includes an end rail section 30. Each end section 28 also includes an outrigger 32 attached to the under surface of the end rail section 30. The outrigger 32 extends outward of the end section 28 towards a pivot on post 34 and is attached to the weighted lever arm 36. As the glass sheet G supported on rails 26 and 30 is heated, the lever arm 36 moves downward under the force of gravity against the lessening opposing force of the glass sheet G as it becomes heat softened, to provide a closing pressure that pivots the end sections 28 upward to a closed position as shown in FIG. 2. In this closed position, the upper edges of the rails 30 form continuations of the shaping surface provided along the upper edges of the central shaping rails 26 so that the shaping rails 26 and 30 form a continuous outline shaping surface conforming in elevation and outline to the desired shape of the glass sheet G slightly inboard of the glass sheet parameter.

FIG. 2 shows press assemblies 38 and 40 which are the subject of this invention as they are positioned in the lehr relative to the support mold 24 while supported on a carriage 42. The assemblies 38 and 40 are similar in construction. The following discussion will be directed to the assembly 38 with the understanding that the discussion is applicable to assembly 40 unless otherwise indicated.

Figure 3:
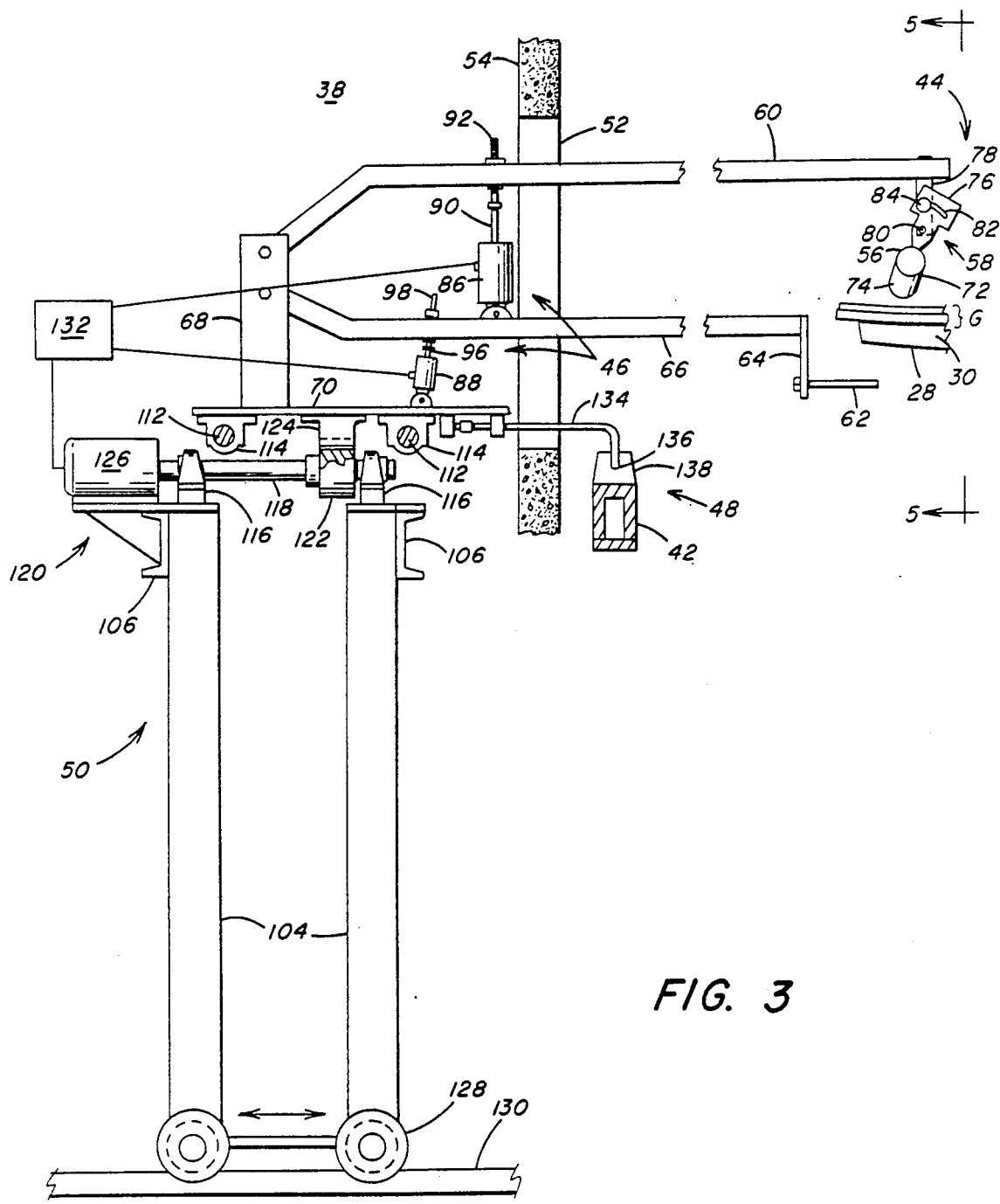
FIG. 3 is a side elevational view of the shaping arrangement illustrated in FIG. 2, with portions removed for clarity.
Figure 4:
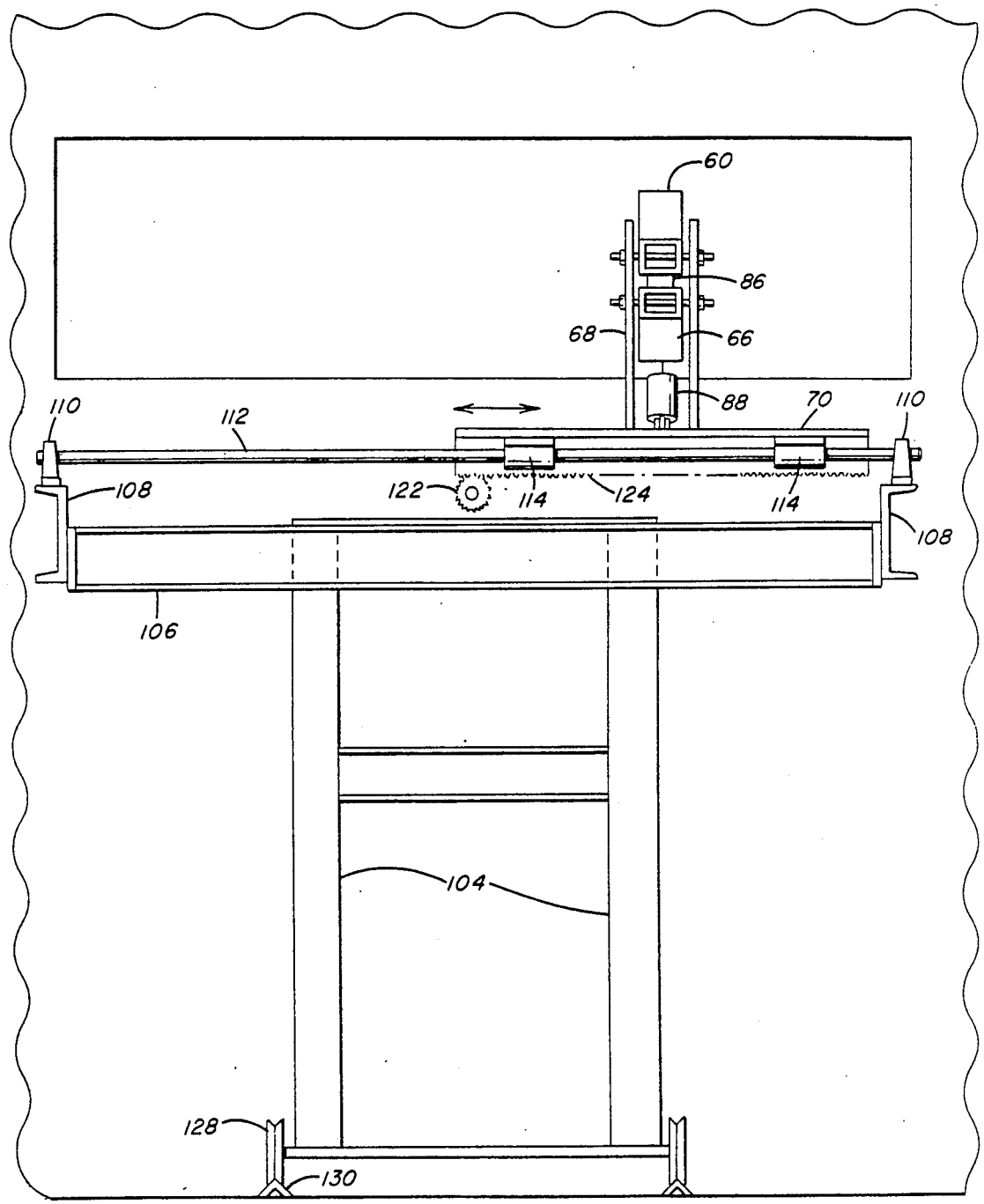
FIG. 4 is a rear elevational view of the shaping arrangement illustrated in FIG. 2, with portions removed for clarity.

Referring now to FIGS. 3 and 4, the press assembly 38 includes pressing device 44 to shape a pair of glass sheets G, a positioning and biasing means 46 to maintain the pressing device in contact with the glass sheets G, an actuating means 48 to activate the pressing device 44 and positioning and biasing means 46, and a support stand 50.

The pressing device 44, which shapes glass sheets G while they move through the lehr supported on the mold 24, is inserted into the lehr through opening 52 in the lehr wall 54 and includes a glass contacting press member 56 supported by mount 58 on an upper arm 60 and a rail support 62 mounted on plate 64 of lower arm 66. The upper arm 60 and lower arm 66 are pivotally connected to a bracket 68 on sliding base 70 of support stand 50. Arms 60 and 66 are moved by positioning and biasing means 46 to shape the glass sheets G, as will be discussed later.

Although not limiting in the present invention, in the particular embodiment illustrated in FIG. 3, the press member 56 is a curved cylindrical member 72 constructed from a heat resistant material such as stainless steel, which contacts upper one of the glass sheets G as viewed in FIG. 3 along a contact line to impart additional shape to the glass sheets G. The glass sheet contacting surface 74 of the pipe member 72 corresponds to the desire curvature of the glass sheets G along the contact line. It should be appreciated that the glass sheet contacting surface 74 of pressing member 56 may be such that it contacts extended surface portions of the upper one of the glass sheets G as viewed in FIG. 3 and if required, the entire glass sheet surface.

The mount 58 which supports the press member 56 is secured to the end of arm 60 and includes a positioning plate 76 which is attached to the pipe member 72 and is pinned to an arm 78 at support pin 80. Plate 76 includes a slot 82 that receives positioning bolt 84. In operation, the pipe member 72 is positioned by rotating it about the support pin 80 and sliding slot 82 along bolt 84. Tightening bolt 84 captures plate 76 between bolt 84 and arm 78 and secures member 72 in position.

As an alternative, the member 56 may be pinned to a bracket (not shown) at the end of arm 60 such that it may rotate about a horizontal axis generally perpendicular to the longitudinal axis of the member 56 while being prevented from being rotated about a vertical axis at the end of the arm 60, as shown in U.S. Pat. No. 4,804,397. This pinned connection allows the members 56 to be self aligning as it contacts the upper one to the glass sheets G as viewed in FIG. 3 so that the press member 56 will operate effectively even if the entire contacting surface 74 of the press member 56 does not contact the upper one of the glass sheets G as viewed in FIG. 3 surface simultaneously.

Arms 60 and 66 are pivoted about bracket 68 by positioning and biasing means 46 to move the press member 56 and rail support 62, respectively. This movement is initiated by activating means 48, as will be described later. In the particular embodiment of the invention illustrated in FIGS. 3 and 4, the positioning and biasing means 46 includes cylinders 86 and 88. As viewed in FIG. 3, the lower end of cylinder 86 is pinned to arm 66 with piston rod 90 of the cylinder 86 pinned to adjustable connecting rod 92 which is secured to arm 60. The lower end of cylinder 88 is pivotally mounted on sliding base 70 with piston rod 96 of the cylinder 88 pinned to adjustable connecting rod 98 which is secured to arm 66. Cylinder 86 operates to move press member 56 downward into contact with the glass sheet G surface as cylinder 88 operates to move rail support 62 upward into contact with rail 30 of the mold 24, to prevent end section 28 from pivoting downward in the direction of the movement of the pressing member 56 during the pressing operation, as will be fully discussed later. Based on the teachings of this disclosure, it would be obvious that as an alternative, rail support 62 can contact outrigger 32 or any other portion of the end section 28 to maintain the end section 28 in the closed position shown in FIG. 2.

Although the cylinders 86 and 88 are preferably pneumatic or hydraulic cylinder, it is obvious to one skilled in the art that other positioning and biasing means may be used.

With continued reference to FIGS. 3 and 4, support stand 50 further includes a support carriage 102 having post members 104, sliding rail support members 106 and 108, and shaft support blocks 110 mounted on support members 108 to support sliding rails 112. The rails 112 extend in a longitudinal, downstream direction relative to the lehr and are slidably captured by collars 114 mounted to the bottom of the sliding base plate 70. Pillow blocks 116 are mounted on members 106 to support drive shaft 118 of the press assembly drive arrangement 120. Drive shaft 118 includes a gear 122 which meshes with gear rack 124 secured to the underside to the sliding base plate 70. Motor 126 drives shaft 118 so that the base plate 70 supporting pressing device 44 and positioning and biasing means 46 of the press assembly 38 moves longitudinally along the rails 112. The motor 126 of drive arrangement 120 is preferably a reversible drive which is capable of driving the base plate 70 both upstream and downstream relative to the lehr. As an alternative, multiple motors or a clutch arrangement may be used to move the press assembly 38 along the lehr.

As an alternative to the drive arrangement shown in FIGS. 3 and 4, the stand 50 can be driven directly from the stub roll drive (not shown) so that any change or variation in the lehr conveying speed will be directly transferred to the movement of the stand 50.

Posts 104 are mounted on wheels 128 which ride on rails 130 which are generally perpendicular to the lehr. This arrangement allows the press assembly 38 to be moved farther into or withdrawn from the lehr so as to properly position the press member 56 relative to the traveling glass G. As an alternative, the post 104 can be fixed and sliding base 70 and drive assembly 120 may be positioned on slides positioned perpendicular to the direction of the lehr to allow for the adjustment of press assembly 38 into and out of the lehr. Furthermore, controller 132 may be connected to drives (not shown) to automatically move the press assembly 38 into or out of the lehr. Sensors (not shown) may be positioned in the lehr to locate the position of the carriage 42 relative to the centerline of the lehr and controller 132 can automatically reposition the press assembly 38 in response to the sensor signals.

Actuator means 48 initiates the pressing cycle. Although not limiting in the present invention, the actuator means 48 in the particular embodiment illustrated in FIGS. 3 and 5 is similar to that disclosed in U.S. Pat. No. 4,804,397, and includes an elongated L shaped pivoting trip arm 134 mounted to the underside of base plate 70. As the mold carriage 42 is conveyed through the lehr, tip portion 136 of trip arm 134 contacts a trip plate 138 mounted on the downstream end of the carriage 42, causing the trip arm 134 to rotate and initiate a timing sequence in controller 132 (shown in FIG. 3 only). The controller 132 controls the movement of the press assembly 38 via motor 126 and the pivoting action of the arms 60 and 66 via cylinders 86 and 88 as the mold 24 continues to move through the lehr with the heat softened glass sheets G supported thereon.

It would be obvious to one skilled in the art that there are other sensing devices and arrangements, well known in the art, to activate the cylinders 86 and 88 and motor 126 rather that using a trip arm 134. For example, light or temperature sensors may be used to locate the exact position of the support carriage 42 within the lehr and initiate a timing sequence to activate and deactivate cylinders 86 and 88 as well as activate and reset the drive arrangement 120.

The press assembly drive arrangement 120 moves the pressing device 44 along with the moving mold 24. The controller 132 matches the speed of the sliding base plate 70 with the mold support carriage 42 as it travels through the lehr so that there is no relative movement between the pressing device 44 and the glass sheets G. In glass sheet configurations where it is critical that the press member 56 contact the upper one of the glass sheets G as viewed in FIG. 3 at a precise location on the upper one of the glass sheets G as viewed FIG. 3, the mold 24 with the glass sheets G supported thereon may be aligned and squared within the lehr prior to being contacted by the pressing member 56. The mold 24 may be aligned in any convenient fashion such as that disclosed in U.S. Pat. No. 4,290,796 to Reese et al., which teachings are herein incorporated by reference.

As discussed earlier, the heat softened glass sheets G tend to draw glass from the longitudinal end portions during sag bending. As a result, the peripheral portions of the glass sheets G tend to flatten out i.e. the curvature of the glass sheets about their periphery, and in particular along the A-post is reduced. Referring to FIG. 6, line 140 represents the curvature of a glass sheet G after a conventional sag bending operation. As taught in the present invention, selected portions of the glass sheet may be contacted by the press member 56 to urge the glass sheet downward as indicated by arrow 142 so as to conform the glass sheet to the desired configuration as shown by line 144. As a result of this pressing action, the edge 146 of the glass sheet G rotates upward, i.e. counterclockwise as viewed in FIG. 6, increasing its approach angle 148 to that required for proper installation and resultant aerodynamics of the vehicle.

Figure 7:
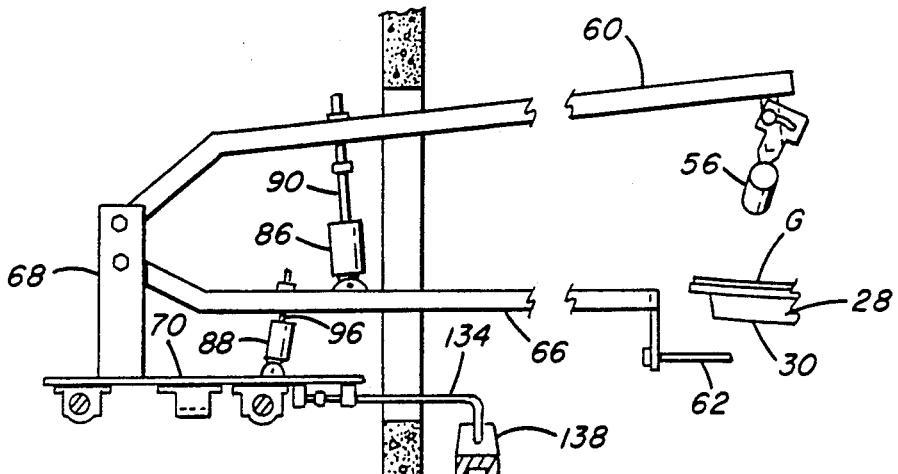
FIGS. 7 through 9 are schematic side elevational views illustrating the operating sequence of the present invention, with portions removed for clarity.
Figure 8:
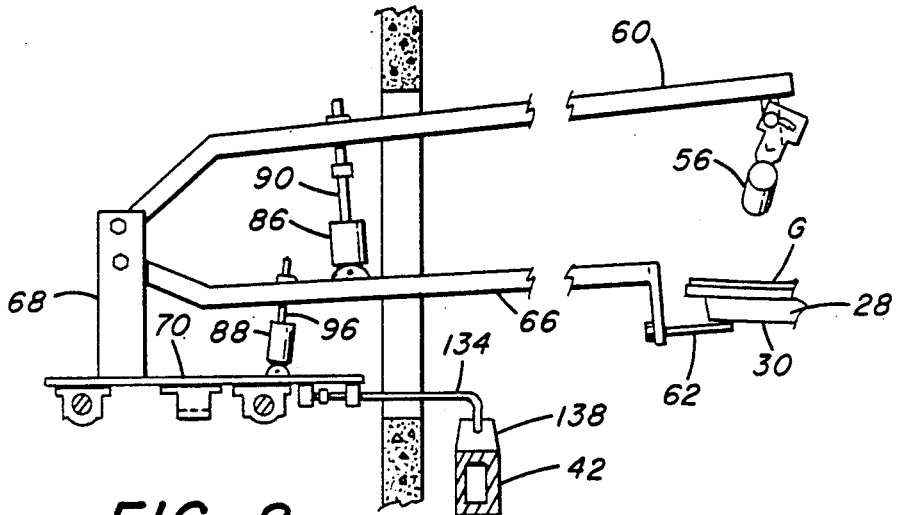
Figure 9:
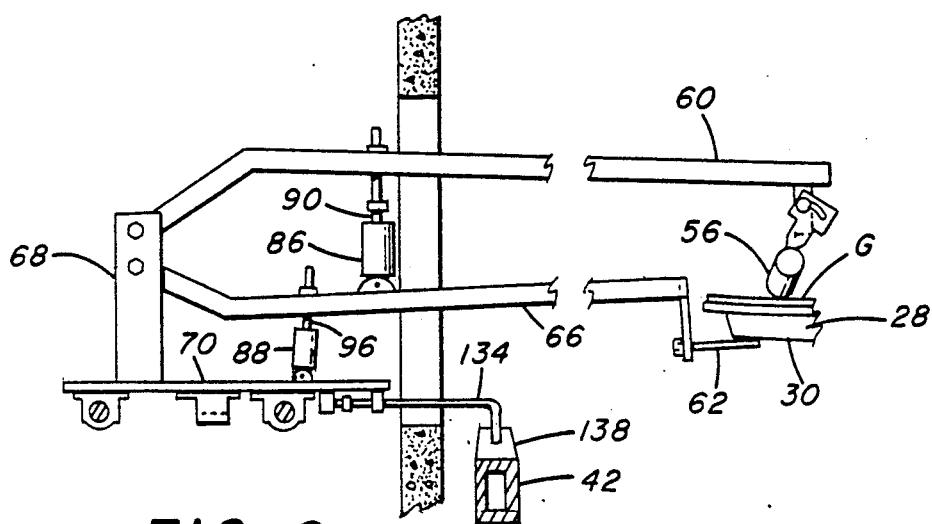

In operation, glass sheets G are positioned on the shaping rails 26 and 30 of the glass support mold 24, serially conveyed through the lehr on the mold carriages 42 and heated to their heat deformation temperature so that the glass sheets G sag by gravity so as to conform with the shaping rails 26 and 30. As the heat softened glass sheets G on mold 24 approach assemblies 38 and 40, piston rod 96 is drawn into cylinder 88 and piston rod 90 is extended from cylinder 86 to provide the required clearance between pressing member 56 and rail support 62 and allow the end section 28 of the mold 24 to pass therebetween as shown in FIG. 7. As the mold carriage 42 continues downstream in the lehr, tip 136 of the trip arm 134 contacts trip plate 138 which initiates the shaping sequence by the controller 132. Motor 126 is activated and sliding base plate 70 with arms 60 and 66 and pressing member 56 and rail support 62, respectively, mounted thereon moves downstream on rails 112 at the same rate of travel as the mold carriage 42. The cylinder 88 extends piston arm 96 causing arm 66 to rotate counterclockwise about bracket 68 as shown in FIG. 8 so that rail support 62 contacts the lower side of the rail 30 of end section 28. End section 28 will have already pivoted to an upward position as discussed earlier. Thereafter cylinder 86 retracts piston rod 90 causing arm 60 to rotate clockwise about bracket 68 as shown in FIG. 9 thus lowering pressing member 56 into contact with the upper major surface of the glass sheets G on the rail 30. The cylinder 86 provides a pressing force so as to insure that the glass sheets G conform to the shape of the contacting surface 74 of the pressing member 56 while cylinder 88 prevents end section 28 of mold 24 from pivoting downward and opening the mold 24. After a predetermined time interval of contact between the pressing member 56 and the glass sheets G, the cylinders 86 and 88 return to their original positions, rotating arm 60 upward and arm 66 downward so that the pressing assemblies 38 and 40 are no longer in contact with the glass sheets G or mold 24. The motor 126 then reverses direction and moves sliding base plate 70 along rails 112 back to its original position to wait the next mold carriage 42.

As an alternative, the operating sequence discussed may be modified to account for variations in the height of mold 24 and in particular, the rail 30 as the molds 24 are conveyed through the lehr. In the modified sequence, cylinder 88 would raise arm 66 to move rail support 62 to a position near to but below rail 30. Cylinder 86 would then lower arm 60 to contact the glass surface G with pressing member 56. Additional movement of lower arm 66 via cylinder 88 would be coordinated with cylinder 86 to raise arm 66 and allow cylinder 86 to "squeeze" the rail supported glass G between pressing members 56 and rail support 62.

It is understood that although the present invention teaches a traveling press arrangement, as an alternative the mold carriage 42 may be stopped and pressed by a stationary press assembly. Although such an arrangement would eliminate the need for the rail mounted sliding base plate 70, it would increase the cycle time within the lehr by requiring the molds 24 to stop and be aligned (if necessary) prior to pressing and restart to continue through the lehr.

Although not limiting in the present invention, the pressing assemblies 38 and 40 are placed at the beginning of the annealing zone 16. At this point the glass is soft enough to be formed by the pressing member 56 and yet it hardens quickly as the pressing assemblies 38 and 40 enter the annealing zone 16.

In addition, it would be obvious to use multiple pressing assemblies along each side of the heating lehr if the desired shape required a difficult curved configuration.

FIG. 10 illustrates an alternative embodiment of the invention which allows the upper and lower arms of the press assemblies to move independently of each other.

Specifically, upper arm 150 and lower arm 152 are supported on base 154 by a bracket 156. The positioning and biasing means 46 includes a cylinder 158 with a lower end pivotally mounted on the base 154 with a piston rod 160 of the cylinder 158 pinned to a connecting rod 162 in the lower arm 152. Means 46 also includes cylinders 164 (only one shown in FIG. 10) positioned on either side of the upper arm 150. The lower ends of the cylinders 164 are pivotally mounted on the base plate 154 with piston rods 166 of cylinder 164 pinned to connecting rods 168 of mounting bar 170 which in turn is secured to the upper arm 150. With this arrangement, the movements of the lower arm 152 via the cylinder 158 and the upper arm 150 via cylinders 164 are independent of each other. It is apparent to one skilled in the art, that based on these teachings, one of the cylinders 164 may be replaced with a guide and/or slide arrangement to help direct the movement of the upper arm 150.

As another alternative, both the upper arm 60 and lower arm 66 shown in FIG. 3 may be individually mounted on separate brackets (not shown) to the base 70 of the support stand 50 so that each may operate independently of the other.

The present invention provides a positive means for shaping heat softened glass sheets G on an outline mold as they are conveyed through a heating lehr. The pressing assemblies of the present invention precisely shape the glass sheet at a localized area without changing conveying rates or adversely affecting the curvature or other portions of the glass sheet.

The forms in the invention shown and described in this disclosure represent preferred embodiments and it is understood that various changes may be made without departing from the scope of the invention as defined in the claims that follow.

We claim:

1. In an apparatus for shaping a glass sheet to a desired contour wherein the apparatus includes a support frame, a shaping rail having a pivoting rail section to support a glass sheet to be shaped and means to heat said shaping rail and said sheet to be shaped such that the peripheral edge of said glass sheet conforms to the shape of said shaping rail, the improvement comprising:

an arm member mounted on said support frame and having a rail engaging member mounted on one end of said arm member;

shaping means supported from said frame and having a glass sheet engaging surface corresponding to the desired contour of selected portions of said glass sheet within said pivoting section of said shaping rail;

first means to bias said rail engaging member into engagement with a selected portion of said pivoting section of said shaping rail, said first biasing means includes means for moving said rail engaging member from a first position wherein said rail engaging member is spaced from said selected portion of said pivoting section of said shaping rail to a second position wherein said rail engaging member is biased against said selected portion of said pivoting section of said shaping rail; and second means to bias said shaping means toward said selected portions of said glass sheet within said pivoting section of said shaping rail.

2. The apparatus as in claim 1 wherein said arm member is pivotally supported from said support frame and said first biasing means includes means to pivot said arm member to move said rail engaging member from said first position to said second position.

3. The apparatus as in claim 2 wherein said arm member is a first arm member and further wherein said shaping means includes a second arm member with a glass sheet pressing member mounted on an end of said second arm member and said second biasing means includes means for moving said pressing member from a first position wherein said pressing member is spaced from said selected portions of said glass sheet to a second position wherein said pressing member is biased against said selected portions of said glass sheet.

4. The apparatus as in claim 3 wherein said second arm member is pivotally supported from said support frame and said second biasing means further includes means to pivot said second arm member to move said pressing member from said first position to said second position.

5. The apparatus as in claim 4 wherein said first means to bias moves said rail engaging member to a third position between said first and second positions wherein said rail engaging member is in close proximity to but spaced from said selected portion of said shaping rail.

6. The apparatus as in claim 4 wherein said first biasing means includes a first piston member positioned to pivot said first arm and rail engaging member between said first and second positions and maintain a biasing force on said rail engaging member against said selected portion of said shaping rail when said rail engaging member is in said second position.

7. The apparatus as in claim 6 wherein said second biasing means includes a second piston member positioned to pivot said second arm and pressing member between said first and second positions and maintain a biasing force on said pressing member against said selected glass sheet portions when said pressing member is in said second position.

8. The apparatus as in claim 7 wherein said second piston is positioned between said first and second arm members.

9. The apparatus as in claim 7 wherein said means to heat said shaping rail and said sheet to be shaped includes a heating lehr and said shaping rail with said glass sheet supported thereon is horizontally movable through said heating lehr and further including means to horizontally move said support frame relative to said lehr and means to synchronize the horizontal movement of said support frame with the horizontal movement of said glass sheet on said shaping rail such that there is no relative horizontal movement between said glass sheet and said support frame in the direction in which said support frame is moved through said lehr when said shaping means and said rail support means contact said glass sheet and said support rail, respectively.

10. The apparatus as in claim 9 wherein said horizontally moving means include generally horizontally extending rail members supported by a support carriage wherein said support frame is slidably secured to said rail members and further including means to drive said frame along said rails.

11. The apparatus as in claim 9 further including means to position said support frame relative to said shaping rail as said shaping rail moves through said heating lehr and said synchronizing means include means to control and coordinate the movement of said support frame and said first and second arm members with the movement of said shaping rail as said pressing member contacts said selected portions of said glass sheets and said rail engaging member engages selected portion of said pivoting section of said shaping rail.

12. In a method of shaping a glass sheet to a desired curvature including the steps of supporting said glass sheet on a shaping rail and conveying said shaping rail with said glass sheet supported therein through a heating lehr to heat said glass sheet to its heat deformation temperature wherein said glass sheet sags by gravity and a selected portion of said shaping rail is movable relative to the remaining portions of said rail to provide a generally continuous shaping rail such that the perimeter of said glass sheet is supported by and substantially conforms to the shape of said shaping rails, the improvement comprising:

engaging selected portions of said shaped glass sheet supported within said movable portion of said rail with a shaping means having a sheet engaging surface with the desired shape of said glass sheet at said selected portions;

biasing said shaping means against said selected portions of said sheet to conform said selected portions to said sheet engaging surface of said shaping means;

engaging said movable portion of said shaping rail with a rail engaging means;

biasing said rail engaging means against said movable rail portion to maintain said movable rail portion in a generally fixed position; and synchronizing the movement of said shaping means and said rail engaging means with said conveying of said shaping rail through said lehr such that there is no relative horizontal movement between said shaping means of rail engaging means and said glass sheet or said shaping rail, respectively, as said shaping means is biased against said selected surface portions of said glass sheet and said rail engaging means is biased against said movable portion of said shaping rail.

13. The method as in claim 12 wherein said engaging step includes moving said rail engaging means from a first position wherein said rail engaging means is spaced from said movable portion of said shaping rail to a second position wherein said rail engaging means engages said movable portion of said shaping rail.

14. The method as in claim 13 wherein said contacting step includes moving said shaping means from a first position wherein said shaping means is spaced from said selected surface portions of said glass sheet to a second position wherein said shaping means contacts said selected surface portions of said glass sheet.

15. The method as in claim 14 wherein prior to moving said rail engaging means and said shaping means to said second position, respectively, further including the steps of moving said rail engaging means to a third position intermediate between said first and second positions and in close proximity to but spaced from said movable portion of said shaping rail and thereafter moving said shaping means from its first position to its second position and moving said rail engaging means from its third position to its second position.

16. In an apparatus for shaping a glass sheet to a desired contour wherein the apparatus is of the type having a shaping rail, the rail having a pivoting section, and means for heating the shaping rail and the sheet to be shaped, the improvement comprising:

a frame mounted in spaced relation to the shaping rail;

first engaging means;

second engaging means;

means mounted on said frame and acting on said first and second engaging means for positioning said first and second engaging means in spaced relationship to one another a sufficient distance to receive the shaping rail therebetween; and means acting on said positioning means to move said first and second engaging means toward one another while moving said first engaging means toward a position fixed relative to the shaping rail and said second engaging means into engagement with a selected portion of said shaping rail.

17. In a method of shaping a glass sheet to a desired contour wherein the method includes the steps of positioning a glass sheet in a generally horizontal position on a shaping rail, heating the glass sheet to its softening temperature to sag the sheet by gravity, lifting a portion of the shaping rail to lift an end of the glass sheet to impart a contour to the sheet, the improvement comprising:

moving the shaping rail having the glass sheet positioned thereon between first and second sheet retaining means; and at some time after the start of the lifting step, engaging the upper surface of the sheet with the first sheet retaining means at a first predetermined location spaced from the sheet periphery; and engaging the portion of the shaping rail supporting the lifted end of the glass sheet with the second sheet retaining means at a second predetermined position spaced from the first predetermined location to prevent downward vertical displacement of the portion of the shaping rail supporting the lifted end of the glass sheet.

* * * * *

UNITED STATES PATENT AND TRADEMARK OFFICE
CERTIFICATE OF CORRECTION

PATENT NO. : 5,049,178
DATED     : September 17, 1991
INVENTOR(S) : Gordon F. Pereman and John D. Kellar It is certified that error appears in the above-identified patent and that said Letters Patent is hereby corrected as shown below:

Column 11, Claim 12, Line 35, "shaping means of" should read "shaping means or".

Signed and Sealed this

Thirteenth Day of April, 1993

*Attest:*

STEPHEN G. KUNIN

*Attesting Officer*         *Acting Commissioner of Patents and Trademarks*